Nov. 2, 1965  HIROSHI TERAMACHI  3,214,993
SUBSTANTIALLY FRICTIONLESS SCREW MOTION ARRANGEMENT
Filed Nov. 14, 1963  2 Sheets-Sheet 1
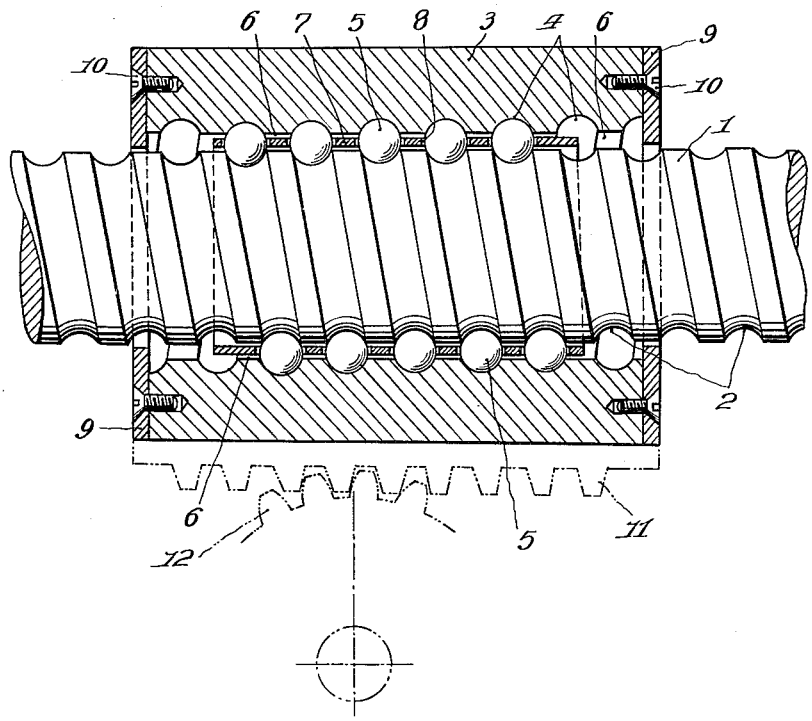
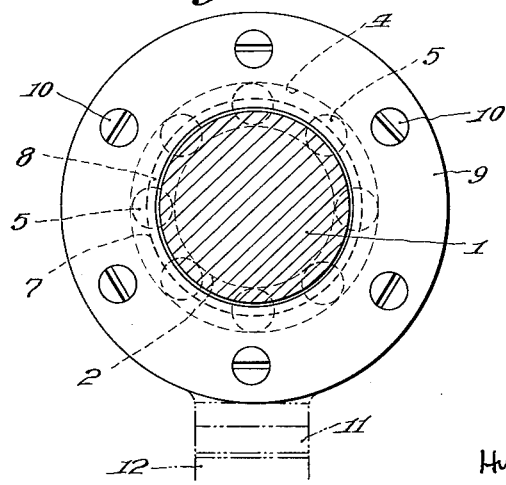
Hiroshi Teramachi
INVENTOR.
BY George B. Aufsesser
attorney Nov. 2, 1965  HIROSHI TERAMACHI  3,214,993
SUBSTANTIALLY FRICTIONLESS SCREW MOTION ARRANGEMENT
Filed Nov. 14, 1963

Hiroshi Teramachi
INVENTOR.

BY George B. Oujevolt
Attorney

United States Patent Office 3,214,993
Patented Nov. 2, 1965

3,214,993
SUBSTANTIALLY FRICTIONLESS SCREW
MOTION ARRANGEMENT
Hiroshi Teramachi, 44 1-chome Hatsudai,
Shibuya-ku, Tokyo, Japan
Filed Nov. 14, 1963, Ser. No. 323,619
1 Claim. (Cl. 74—459)

This invention relates to a substantially frictionless screw motion using ball bearings, and more particularly pertains to a ball and screw arrangement in which the frictional coefficient is reduced by eliminating mutual frictions between the balls so that the screw motion can be effectively used, and which can be easily manufactured.

It is an object of this invention to provide a screw motion arrangement comprising a shaft formed with screw grooves on the circumferential surface thereof, an outer race disposed in engagement with said shaft and having screw grooves formed in the inner side thereof, said screw grooves having the same pitch as that of the screw grooves formed in said shaft, a retainer adapted to retain balls accommodated in said both screw grooves, said retainer being inserted in a gap between said shaft and outer race disposed in engagement therewith, and side plates locked to the opposite ends of said outer race.

This invention will be described, by way of example, in conjunction with the accompanying drawings, in which:

FIG. 1 is a longitudinal sectional view of the screw motion arrangement in accordance with this invention;

FIG. 2 is an end view thereof;

Figure 3:
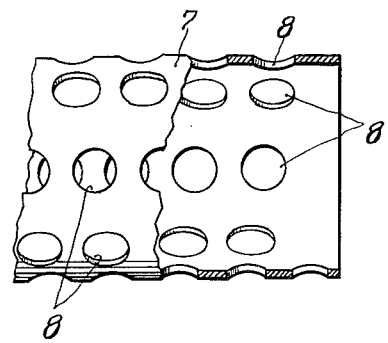
FIG. 3 is a side view, partly cut-away and removed, of the ball-retainer.
Figure 4:
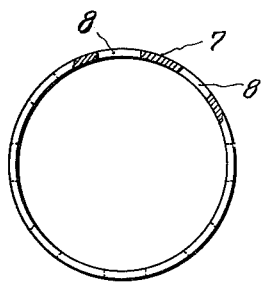
FIG. 4 is an end view, partly cut-away, of the ball-retainer shown in FIG. 3.

Referring to FIG. 1, a shaft 1 is formed with male screw grooves 2 for accommodating balls 5 therein, and an outer race 3 is disposed in engagement with said shaft 1, and said outer race 3 has female screw grooves 4 formed in the inner side thereof which have the same pitch as that of the male screw grooves 2 formed in said shaft 1. The balls 5 are accommodated in the both screw grooves 2, 4. Thus, the outer diameter of the shaft 1 is made somewhat smaller than the diameter on the pitch circle of the balls, while the inner diameter of the outer race 3 is made somewhat larger than the diameter on the pitch circle of the balls, so that a gap 6 is formed between the shaft 1 and outer race 3. The balls 5 being accommodated in the screw grooves 2, 4 are inserted in ball-holes 8 formed in a retainer 7 whose diameter is such that the retainer 7 can be loosely fitted in said gap 6, thus said balls 5 are rotatably disposed in both screw grooves 2, 4. The ball-retainer 7 has a thickness which can be divided substantially half and half by the pitch circle of the balls. For example, when a pipe having a thickness of 0.8 mm. is employed, the outer diameter of the ball-retainer should be 0.8 mm. larger than the pitch circle of the balls, while the inner diameter of the ball-retainer should be 0.8 mm. smaller than the pitch circle of the balls. Normally, a pipe having a thickness of about 0.8 mm. is employed, and the retainer is formed with a plurality of ball-holes 8 in register with the circumference of said screw grooves 2, 4, as shown in FIG. 3.

As shown in FIG. 1, the retainer 7 is made shorter than the outer race 3 by a predetermined length. The retainer 7 and the outer race 3 are arranged in such a manner that the ends of the former are spaced by said predetermined length from the corresponding ends of the latter. Thus, the outer race 3 can be moved through rotation of shaft 1 to the right and to the left, as viewed in FIG. 1, within the maximum distance of two times the length of the sum of said spaces. Supposing that each of said spaces is 13 mm. for example, the maximum movement of the outer race 3 to the right and left, will be $(13+13) \times 2 = 52$ mm.

In FIG. 1, the reference numeral 9 indicates two side plates suitably locked to two ends of the outer race 3 by means of screws 10 thereby preventing removal of the retainer 7 and invasion of dusts into the inner portion of the screw motion arrangement.

In FIGS. 1 and 2, a portion 11 indicated by a phantom chain line is a rack provided on the outer race, and the reference numeral 12 indicates a pinion adapted to intermesh with said rack. This illustrates an example in which the screw motion arrangement is employed in the steering mechanism of an automobile.

The ball bearing and screw arrangement in accordance with this invention has the above described construction, and is similar to known device in that the outer race 3 is linearly moved in the axial direction of the shaft 1 through rotation of the shaft 1. In the device of this invention, however, there is provided the retainer 7 encircling the shaft 1 and having a shorter length than that of the outer race 3. Since the balls are rotatably retained by the retainer, rotation of the shaft 1 enables the outer race 3 to be reciprocally moved in a distance which is twice as long as the difference in length between the retainer and the outer race. Furthermore, friction between the balls is completely eliminated by means of said retainer, and the movement of balls is effected in a reasonable and natural manner since the balls are rotatably moved together with the retainer. Consequently, the device of this invention is best suited to a part of a machine, which has a low frictional co-efficient and a very high efficiency and performs a constant stroke movement, such as the steering mechanism of an automobile or the like. In addition the device has advantages such as the simplified structure of the same which facilitates the manufacture thereof and thus the device can be supplied to users at a lower price.

Figure 5:
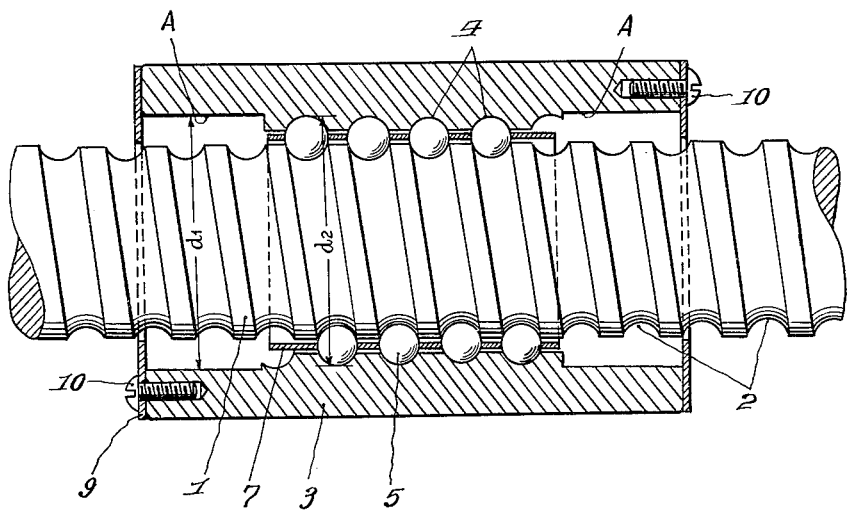
FIG. 5 is a longitudinal sectional view of another embodiment of this invention.

In order to increase the stroke of the device of this invention and to manufacture the same at lower cost, a portion indicated by A is formed at the opposite end portions of the outer race 3, the diameter $d_1$ of the portion A being made equal to the female screw bottom diameter $d_2$ as shown in FIG. 5. The portion A is not necessarily formed integrally with the outer race 3, as illustrated in FIG. 5, but the same can be replaced by a separate ring shaped guide member, and thus the cost of the devices of this invention can be further reduced.

What I claim is:

In combination with a non-rotatable nut member having external rack teeth in mesh with a driven pinion gear and an internal spiral groove, a screw drive mechanism for axially shifting said nut member comprising:

a screw shaft rotatably mounted in coaxial relation to said nut member having an external spiral groove radially spaced from said internal groove;

a floating carrier coaxially mounted for rotation and axial displacement relative to the screw shaft and the nut member in radially spaced relation to said grooves;

a plurality of balls rotatably mounted by the carrier in driving engagement with both of said grooves for rotation of the carrier at a lower rotational speed than the screw shaft, whereby the nut member is axially displaced in response to rotation of the screw shaft by a greater amount than the carrier;

and means secured to the nut member for limiting axial displacement of the carrier relative to the nut member to predetermine the axial stroke of the nut member.

References Cited by the Examiner

UNITED STATES PATENTS

| 2,634,624 | 4/53 | Burt | 74—459 |
| 2,711,655 | 6/55 | Schottler | 74—459 |
| 2,768,532 | 10/56 | Russell | 74—459 |
| 2,905,012 | 9/59 | Tohr et al. | 74—424.8 |
| 3,062,070 | 11/62 | Beatty et al. | 74—459 |

FOREIGN PATENTS 139,400  7/30  Switzerland.

DON A. WAITE, *Primary Examiner.*